Sept. 22, 1925.                                                    1,554,731
                              S. JENCICK
      OIL CIRCULATING AND INDICATING SYSTEM FOR INTERNAL COMBUSTION ENGINES
                           Filed Aug. 30, 1919
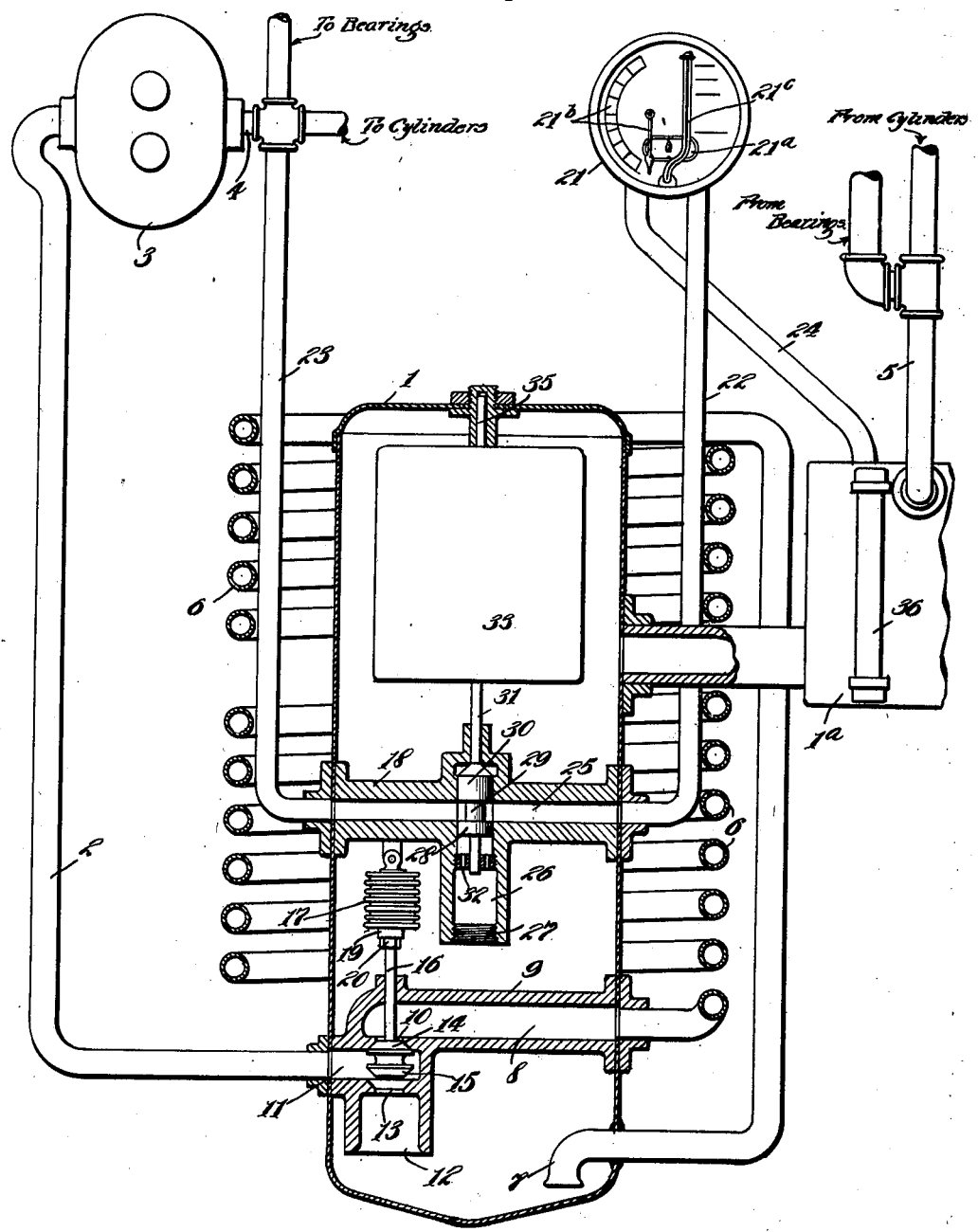
INVENTOR,
Stephen Jencick
BY Brockett and Hyde
          ATT'YS.

Patented Sept. 22, 1925.

1,554,731

UNITED STATES PATENT OFFICE.

STEPHEN JENCICK, OF CLEVELAND, OHIO, ASSIGNOR TO GUSTAVUS A. SCHANZE, OF CLEVELAND, OHIO; P. L. SCHANZE ADMINISTRATOR OF SAID GUSTAVUS A. SCHANZE, DECEASED.

OIL CIRCULATING AND INDICATING SYSTEM FOR INTERNAL-COMBUSTION ENGINES.

Application filed August 30, 1919. Serial No. 320,957.

*To all whom it may concern:*

Be it known that I, STEPHEN JENCICK, a subject of the Austrian Government (who has declared his intention of becoming a citizen of the United States), residing at Cleveland, in the county of Cuyahoga and State of Ohio, have invented certain new and useful Improvements in Oil Circulating and Indicating Systems for Internal-Combustion Engines, of which the following is a specification.

This invention relates to oil circulating and indicating systems for internal combustion engines. The object of the invention is to provide for increasing the efficiency and effectiveness in operation of the internal combustion engine by maintaining the oil or lubricating liquid in the lubricating system at approximately a uniform temperature; to automatically correct any departure of the lubricant from the normal temperature, especially increases of said temperature, so as to constantly maintain distribution of comparatively cool lubricant to the engine cylinders, bearings and other parts to be lubricated; and to indicate to the operator of the engine not only the usual qualities or conditions of the lubricating system or of the oil therein, such as the existence of flow or pressure, the degree of pressure, or the temperature of the lubricant, but to also give to the operator advance warning of approaching abnormal or dangerously low level of the lubricant to enable him to replenish the supply before injury to the engine or the parts operated thereby occurs.

Further objects of the invention are in part obvious and in part will appear more in detail hereinafter.

The invention comprises the construction and arrangement of parts hereinafter described and claimed.

In the drawings, the view represents somewhat diagrammatically a lubricating system embodying the invention.

The invention may be applied to any form of internal combustion engine, either a stationary engine such as is used for power plants, or an internal combustion engine when used upon a motor vehicle, boat, aeroplane, or like device.

The drawings illustrate a simple form of lubricating system adapted for any of such uses, it being understood that the form and proportions of the parts may be varied within wide limits according to the particular purpose for which the internal combustion engine is to be used.

1 represents a reservoir for holding the supply of lubricating oil which is distributed to the engine cylinders, pistons and other working parts not only of said engine but the crank shaft and other friction producing parts operated thereby. This reservoir may be of any suitable shape, size, or design, and for convenience is illustrated as a cylinder having a vertical axis. When considerations of economy of space limit the height of the reservoir it may obviously be provided with horizontal extensions or the cylinder member 1 shown may be in the form of a well communicating with a larger main reservoir 1$^a$, of shallow pan form, thereby extending its capacity as much as desired without unduly increasing its height.

The lubricating oil in said reservoir is conducted therefrom through a pipe 2 to any suitable device for circulating it to the engine cylinders, piston, and other working parts. This circulating device may for example be a rotary pump 3 which supplies the oil through a pipe 4 to the engine and bearings, from which the used lubricant is returned through a pipe 5 to the reservoir 1$^a$.

To increase the efficiency of the system suitable means is provided for maintaining the temperature of the lubricant substantially uniform. For this purpose means is provided for circulating a part or all of the lubricant through a radiator to cool the same when its temperature rises above normal. The radiator may be of any suitable kind or description. For example, it may be similar to the radiators used for cooling the cooling water on a motor vehicle, or may be of any other suitable form located in such position as to enable air to be circulated over or through the radiator for cooling purposes. The cooling air may be supplied either by motion or travel of the vehicle itself, or, when desired and necessary, may be circulated over the radiator by a suitable fan (not shown) as is customary in this class of devices. The radiator shown in the drawings comprises a helical coil 6 of metal tubing wound around the cylinder or reservoir 1. One end of said coil passes into the reservoir 1 and has an open inlet 7 at a low level therein. The other end of said coil communicates with the passage 8 of a hollow member 9 located within the reservoir 1, said passage communicating through the port 10 with a passage 11 communicating with the pump pipe 2. Member 9 is also provided with a separate inlet passage 12 open at a low level in the reservoir 1 and communicating with passage 11 by way of a port 13.

Around the ports 10 and 13 are located valve seats co-operating respectively with two valve members 14, 15 on a valve rod 16 slidable in an opening in member 9 and connected at its outer end to a suitable thermostat 17 or thermal controlling device sensitive to the temperature of the liquid in reservoir 1. The thermostat 17 shown in the drawings is of the hollow corrugated metal variety which is usually filled with some liquid which expands on increase of temperature. This thermostat is connected to a fixed point such as to a hollow member 18 within the reservoir, so that its expansion tends to close the valve 15 while its contraction closes valve 14.

Preferably suitable means is provided for producing relative adjustment between the valve members and thermostat to enable the valves to be set to operate at any desired temperature, so that the normal temperature of the lubricant may be maintained at any desired point within limits. The adjustment shown in the drawings for this purpose is provided by threading the upper end of the rod 16 into a member 19 carried by the thermostat and locking it in adjusted position by a lock nut 20, although any other suitable adjusting means may be employed for this purpose.

The operation of the mechanism so far described is as follows:

Under normal conditions, or when the lubricant is at a low temperature or at any temperature below normal the parts are in the position shown in the drawings with valve 14 closed. The lubricant in reservoir 1 is therefore drawn directly through the passages 12 and 11 to pipe 2 and is distributed to the engine cylinders and bearings from which it is returned directly to the reservoir to be used again. So long as the temperature is normal or subnormal this circulation continues. On increase in temperature of the oil, such as may occur from restriction of the pipes or passages causing an insufficient supply of lubricant to the cylinders or bearings with consequent over- heating, or as the result of any other of the numerous circumstances which increase the temperature of the working parts, the increased temperature of the oil affects the thermostat to expand the same and thereby opens valve 14. As soon as said valve opens a suction effect is produced in the passage 8, so that some of the oil in the reservoir 1 flows to and through the radiator 6, as a result of which the temperature of the oil flowing through the reservoir is decreased. Valve 14 may partly open without closing valve 15, in which case some oil flows directly to the pump through the passage 12 while the remaining oil is cooled in the radiator. If, however, the temperature of the oil rises sufficiently, valve 15 may fully seat so that all of the oil is circulated through the radiator. This is the limiting condition and the radiator is proportioned as to have sufficient capacity to properly cool the entire supply of oil under the most trying conditions.

As is well known many causes contribute to the production of heat and rise of temperature in internal combustion engines and the working parts operated thereby. Some of these causes are improper mixture of fuel and air, tightness of bearings, defects in the cooling water circulating system which impede or retard circulation therein, insufficiency of water in said system, or insufficiency or inefficiency in the supply of lubricant. All of these features have their effect upon the temperature of the oil in the lubricating system. It is therefore desirable not only to keep down the temperature of the lubricant by maintaining it at a fairly definite normal temperature, to the end of correcting or overcoming any causes which contribute to rise of temperature so far as cool lubricant can accomplish this, but it is also important to indicate to the operator not only the usual qualities or conditions of the lubricating system or the lubricant therein, such as existence of pressure or flow in the system, the degree of pressure or the temperature of the oil, but to also give to the operator advance warning of approaching abnormal or dangerously low level of lubricant, said warning being given sufficiently in advance to enable the operator to replenish the lubricant supply before injury to the engine or the parts operated thereby occurs. For this purpose the present lubricating system is provided with such indicating and warning means arranged to function or cooperate with the temperature regulating means. As illustrated, the system is supplied with a gauge 21 connected to a pipe 22 through which oil is supplied under pressure from a pipe 23 communicating with the discharge side of the pump 3. Gauge 21 is conventionally illustrated but may be of various forms, such as a sight feed gauge, an ordinary pressure gauge, or even a thermometer or thermal indicator, or the combination of any two or more thereof. For example, it may be of identically the same form and construction as the indicating gauge illustrated in my copending application for indicating device for internal combustion engines, filed of even date herewith, Serial Number 320,958, to which reference may be had for a more complete description of said gauge. For the purposes of this application it is sufficient to state that the gauge includes a sight feed window 21ª, a pressure indicating pointer and scale 21ᵇ and a thermometer 21ᶜ. 24 indicates a pipe which returns to the reservoir 1ª the lubricating oil circulated over or through the gauge 21 by the pipe 22.

Pipes 22 and 23 communicate with the opposite ends of a channel 25 in the hollow member 18 before referred to. In a chamber 26 of said member closed at its lower end by the plug 27, is located a slide valve 28 having an annular groove or channel 29 and a cylindrical portion 30 controlling the flow of lubricant through the channel 25. The lower end of the stem 31 of the valve slides in a spider 32 while its upper end extends through an opening in member 18 and carries a float 33, for example, a hollow metal float having an upper spindle 35 guided in an opening in the casing.

So long as the level of the lubricant in the reservoir 1 is above a normal or safe point the float 33 lies in its upper position, as shown in the drawings. In this position the channel 29 establishes communication through the passage 25 from pipe 23 to pipe 22. The pressure of the pump is therefore effective in the gauge 21 to indicate both the pressure and existence of flow or pressure. The flow of lubricant through said gauge also affects the thermometer and indicates the temperature. If the supply of lubricant decreases sufficiently the level of lubricant drops to or below a normal level at which the float reaches its lowest position. In this lowest position valve member 28 has dropped so that its cylindrical portion 30 closes the passage 25, thereby obstructing and preventing any further flow of lubricant through said passage or to or through the gauge 21. As a consequence all indicating ability of said gauge ceases. No flow occurs through the gauge so that there is no sight indication at window 21ª; pressures are equalized through the gauge, so that the movable pressure indicating member 21ᵇ drops back to its zero position on the scale, and the lack of circulation of oil over the thermal indicator causes it to soon drop back to an indication of low temperature as soon as the temperature of the oil in the gauge itself decreases. In this manner all of these changed or zero indications thereby produce a new indication, to wit, the indication of approaching abnormal or dangerously low level of oil in the reservoir 1. The failure of any one of the three indicating means to function therefore warns the operator that replenishment of the lubricating oil is immediately necessary, but the parts are so proportioned and adjusted that this warning occurs before the oil is entirely exhausted, thereby enabling the engine to be safely run for a limited period to reach an oil supply.

The reservoir 1 or 1ª may be provided with an ordinary oil level gauge 36 which constantly indicates the actual level of oil, but the gauge 21 serves as an additional warning or check upon the operator to direct his attention to the measure of the oil supply. This is particularly so where the engine itself is normally concealed, as in a motor vehicle, boat or aeroplane, because the warning gauge can be placed upon the dash or instrument board or in some other suitable location where it is always visible to the driver while operating the engine, whereas the gauge 36 is usually concealed with the engine under the hood and is only occasionally visible.

What I claim is:—

1. A lubricating system for internal combustion engines, comprising a reservoir for lubricant, means for supplying lubricant from said reservoir to the internal combustion engine, a radiator, means for conducting lubricant from said reservoir to said radiator, and means sensitive to the temperature of the lubricant for controlling the flow of lubricant to said radiator.

2. A lubricating system for internal combustion engines, comprising a reservoir for lubricant, means for supplying lubricant from said reservoir to the internal combustion engine, a radiator, means for conducting lubricant from said reservoir to said radiator, and means sensitive to the temperature of the lubricant in said reservoir for controlling the flow of lubricant to said radiator.

3. A lubricating system for internal combustion engines, comprising a reservoir for lubricant, a radiator communicating with said reservoir, a pump for delivering lubricant to the internal combustion engine, said pump having its suction side communicating independently with both said reservoir and radiator, and means for automatically controlling the communication between said pump, reservoir and said radiator, said controlling means being sensitive to the condition of the lubricant in said reservoir.

4. A lubricating system for internal combustion engines, comprising a reservoir for lubricant, a radiator communicating with said reservoir, a pump for delivering lubricant to the internal combustion engine, said pump having its suction side communicating with both said reservoir and radiator, and thermally controlled means for controlling the communication between said pump, reservoir and radiator.

5. A lubricating system for internal combustion engines, comprising a reservoir for lubricant, a radiator communicating with said reservoir, a pump for delivering lubricant to the internal combustion engine, said pump having its suction side communicating with both said reservoir and radiator, and thermally controlled means for controlling the communication between said pump, reservoir and radiator, and arranged to cause increasing circulation of lubricant through said radiator as the temperature of the lubricant increases.

6. A lubricating system for internal combustion engines, comprising a reservoir for lubricant, an indicator, means for supplying lubricant from said reservoir to said indicator and to the internal combustion engine, a radiator, means for cooling said lubricant by circulating the same through said radiator, and means affected by the lubricant in said reservoir for controlling the flow of lubricant to said indicator to cause the same to indicate approaching low level of lubricant.

7. A lubricating system for internal combustion engines, comprising a reservoir for lubricant, means for supplying lubricant from said reservoir to the internal combustion engine, a radiator, means for conducting lubricant from said reservoir to said radiator, means sensitive to the temperature of the lubricant for controlling the flow of lubricant to said radiator, and means affected by the lubricant for indicating approaching low level of lubricant therein.

8. A lubricating system for internal combustion engines, comprising a reservoir for lubricant, means for supplying lubricant from said reservoir to the internal combustion engine, a radiator, means for conducting lubricant from said reservoir to said radiator, means sensitive to the temperature of the lubricant in said reservoir for controlling the flow of lubricant to said radiator, and means affected by the lubricant withdrawn from said reservoir for indicating approaching low level of lubricant therein.

9. A lubricating system for internal combustion engines, comprising a reservoir for lubricant, a radiator communicating with said reservoir, a pump for delivering lubricant to the internal combustion engine, said pump having its suction side communicating with both said reservoir and radiator, and means sensitive to the lubricant flowing from said pump to the reservoir for indicating approaching low level of lubricant in said reservoir.

10. A lubricating system for internal combustion engines, comprising a reservoir for lubricant, a radiator communicating with said reservoir, a pump for delivering lubricant to the internal combustion engine, said pump having its suction side communicating with both said reservoir and radiator, thermally controlled means for controlling the communication between said pump, reservoir and radiator, and means sensitive to the lubricant flowing through said pump for indicating approaching low level of lubricant in said reservoir.

11. A lubricating system for internal combustion engines, comprising a reservoir for lubricant, a radiator communicating with said reservoir, a pump for delivering lubricant to the internal combustion engine, said pump having its suction side communicating with both said reservoir and radiator, thermally controlled means for controlling the communication between said pump, reservoir and radiator and arranged to cause increasing circulation of lubricant through said radiator as the temperature of the lubricant increases, and means sensitive to the lubricant flowing through said pump for indicating approaching low level of lubricant in said reservoir.

12. A lubricating system for internal combustion engines, comprising a reservoir for lubricant, means for supplying lubricant from said reservoir to the internal combustion engine, a radiator, means for cooling said lubricant by circulating the same through said radiator, and means affected by the lubricant withdrawn from said reservoir and also sensitive to the lubricant in said reservoir for indicating approaching low level of lubricant in said reservoir.

13. A lubricating system for internal combustion engines, comprising a reservoir for lubricant, means for supplying lubricant from said reservoir to the internal combustion engine, a radiator, means for conducting lubricant from said reservoir to said radiator, means sensitive to the temperature of the lubricant for controlling the flow of lubricant to said radiator, and means affected by the lubricant withdrawn from said reservoir and also sensitive to the lubricant in said reservoir for indicating approaching low level of lubricant in said reservoir.

14. A lubricating system for internal combustion engines, comprising a reservoir for lubricant, means for supplying lubricant from said reservoir to the internal combustion engine, a radiator, means for conducting lubricant from said reservoir to said radiator, means sensitive to the temperature of the lubricant in said reservoir for controlling the flow of lubricant to said radiator, and means affected by the lubricant withdraw from said reservoir and also sensitive to the lubricant in said reservoir for indicating approaching low level of lubricant in said reservoir.

15. A lubricating system for internal combustion engines, comprising a reservoir for lubricant, a radiator communicating with said reservoir, a pump for delivering lubricant to the internal combustion engine, said pump having its suction side communicating with both said reservoir and radiator, and means affected by the lubricant flowing through said pump and also sensitive to the level of lubricant in said reservoir for indicating approaching low level of lubricant in said reservoir.

16. A lubricating system for internal combustion engines, comprising a reservoir for lubricant, a radiator communicating with said reservoir, a pump for delivering lubricant to the internal combustion engine, said pump having its suction side communicating with both said reservoir and radiator, thermally controlled means for controlling the communication between said pump, reservoir and radiator, and means affected by the lubricant flowing through said pump and also sensitive to the level of lubricant in said reservoir for indicating approaching low level of lubricant in said reservoir.

17. A lubricating system for internal combustion engines, comprising a reservoir for lubricant, a radiator communicating with said reservoir, a pump for delivering lubricant to the internal combustion engine, said pump having its suction side communicating with both said reservoir and radiator, thermally controlled means for controlling the communication between said pump, reservoir and radiator and arranged to cause increasing circulation of lubricant through said radiator as the temperature of the lubricant increases, and means affected by the lubricant flowing through said pump and also sensitive to the level of lubricant in said reservoir for indicating approaching low level of lubricant in said reservoir.

In testimony whereof I affix my signature.

STEPHEN JENCICK.